(12) United States Patent
Lee et al.

(10) Patent No.: US 12,735,278 B2
(45) Date of Patent: Sep. 15, 2026

(54) TRANSFER APPARATUS

(71) Applicant: SEMES CO., LTD., Cheonan-si (KR)

(72) Inventors: Nahyun Lee, Ansan-si (KR); Chuljun Park, Seoul-si (KR); Myungjin Lee, Hwaseong-si (KR); Namho Chung, Seoul-si (KR); Wanhee Jeong, Hwaseong-si (KR)

(73) Assignee: Semes Co., Ltd., Chungcheongnam-do (KR)

(*) Notice: Subject to any disclaimer, the term of this patent is extended or adjusted under 35 U.S.C. 154(b) by 460 days.

(21) Appl. No.: 18/456,883

(22) Filed: Aug. 28, 2023

(65) Prior Publication Data

US 2024/0158170 A1 May 16, 2024

(30) Foreign Application Priority Data

Nov. 11, 2022 (KR) ........................ 10-2022-0150963

(51) Int. Cl.
*B65G 54/02* (2006.01)
*H02K 41/03* (2006.01)

(52) U.S. Cl.
CPC ........... *B65G 54/02* (2013.01); *H02K 41/031* (2013.01)

(58) Field of Classification Search
CPC ....... B65G 54/02; H02K 41/031; B25J 19/00; B25J 9/02
USPC .......................................................... 104/292
See application file for complete search history.

(56) References Cited

U.S. PATENT DOCUMENTS 3,563,179 A * 2/1971 Gorjanc .................. B61C 13/04 105/155
5,931,264 A * 8/1999 Gillingham ........... B66B 7/1246 104/127
5,957,057 A * 9/1999 Nakamura ............. E01B 25/24 104/111
8,132,513 B2 * 3/2012 Crawford ................ A63G 7/00 104/53
9,428,198 B2 * 8/2016 Camp ..................... B61B 13/06
10,967,892 B2 * 4/2021 Cooper ................ G05D 1/0088
11,434,007 B2 * 9/2022 Pfau ....................... B65G 69/24
11,718,472 B2 8/2023 Cheng et al.

(Continued)

FOREIGN PATENT DOCUMENTS

JP 2009-203028 A 9/2009
KR 10-2013-0077684 A 7/2013

(Continued)

OTHER PUBLICATIONS

Korean Notice of Allowance datedFeb. 25, 2025 issued in corresponding Korean Appln. No. 10-2022-0150963.

(Continued)

*Primary Examiner* — Troy Chambers
(74) *Attorney, Agent, or Firm* — Harness, Dickey & Pierce, P.L.C

(57) ABSTRACT

A transfer apparatus includes a first guide rail, a second guide rail, a driving module including a main rail and a moving block that moves along the main rail, and a carriage module coupled to the moving block and supporting an article, wherein the carriage module includes first guide wheels configured to be in rolling contact with the first guide rail and second side guide wheels configured to be in rolling contact with the second guide rail.

20 Claims, 9 Drawing Sheets

(56) References Cited

U.S. PATENT DOCUMENTS

| | | | | |
|---|---|---|---|---|
| 2003/0015115 | A1* | 1/2003 | Lamb | H02K 49/046 104/282 |
| 2009/0308697 | A1* | 12/2009 | Boschin | B66B 5/0018 187/409 |
| 2016/0052526 | A1* | 2/2016 | Slurink | B61B 3/00 104/93 |
| 2021/0094770 | A1* | 4/2021 | Hartung | B65G 54/02 |
| 2022/0297980 | A1* | 9/2022 | Liu | B66C 7/08 |
| 2022/0402728 | A1* | 12/2022 | Li | B66B 7/046 |
| 2023/0047079 | A1* | 2/2023 | Duvall | B66B 7/046 |
| 2023/0085908 | A1* | 3/2023 | Gardner | G01L 5/0019 702/42 |
| 2024/0017395 | A1* | 1/2024 | Wu | B25J 9/162 |
| 2025/0178866 | A1* | 6/2025 | Li | B66B 7/048 |

FOREIGN PATENT DOCUMENTS

| | | | |
|---|---|---|---|
| KR | 2018-0100918 | A | 9/2018 |
| KR | 102351808 | B1 | 1/2022 |
| KR | 20220044875 | A | 4/2022 |
| KR | 20220077880 | A | 6/2022 |
| KR | 102570588 | B1 | 8/2023 |

OTHER PUBLICATIONS

Korean Office Action dated Apr. 25, 2024 issued in corresponding Korean Appln. No. 10-2022-0150963.

* cited by examiner

TRANSFER APPARATUS

CROSS-REFERENCE TO RELATED APPLICATION

This application is based on and claims priority under 35 U.S.C. § 119 to Korean Patent Application No. 10-2022-0150963, filed on Nov. 11, 2022, in the Korean Intellectual Property Office, the disclosure of which is incorporated by reference herein in its entirety.

BACKGROUND

1. Field

The disclosure relates to a transfer apparatus configured to transfer an article.

2. Description of the Related Art

In general, semiconductor manufacturing equipment includes multiple floors, and facilities configured to perform processes, such as deposition, exposure, etching, ion implantation, and cleaning are appropriately arranged on respective floors. Articles such as substrates are transferred to a desired floor by a transfer apparatus. In general, transfer apparatus includes rails extending in a transfer direction and carriage modules which are movably installed on the rails and to which the articles are loaded.

SUMMARY

Provided is a transfer apparatus.

Additional aspects will be set forth in part in the description which follows and, in part, will be apparent from the description, or may be learned by practice of the presented embodiments of the disclosure.

According to an aspect of the disclosure, a transfer apparatus includes a first guide rail including a first side surface, a first front surface, and a first rear surface, a second guide rail including a second side surface, a second front surface, and a second rear surface, a driving module including a main rail and a moving block that moves along the main rail, wherein the main rail is provided between the first guide rail and the second guide rail in a first horizontal direction, and a carriage module coupled to the moving block and supporting an article, wherein the carriage module includes a first side guide wheel configured to be in rolling contact with the first side surface of the first guide rail, a first front guide wheel configured to be in rolling contact with the first front surface of the first guide rail, a first rear guide wheel configured to be in rolling contact with the first rear surface of the first guide rail, a second side guide wheel configured to be in rolling contact with the second side surface of the second guide rail, a second front guide wheel configured to be in rolling contact with the second front surface of the second guide rail, and a second rear guide wheel configured to be in rolling contact with the second rear surface of the second guide rail.

In embodiments, each of the first side guide wheel and the second side guide wheel is configured to rotate about a second horizontal direction perpendicular to the first horizontal direction, and each of the first front guide wheel, the first rear guide wheel, the second front guide wheel, and the second rear guide wheel is configured to rotate about the first horizontal direction.

In embodiments, the carriage module further includes: a carriage frame coupled to the moving block, a first wheel bracket which is connected to one side portion of the carriage frame and to which the first side guide wheel, the first front guide wheel, and the first rear guide wheel are mounted, and a second wheel bracket which is connected to the other side portion of the carriage frame and to which the second side guide wheel, the second front guide wheel, and the second rear guide wheel are mounted.

In embodiments, the first side guide wheel is mounted to the first wheel bracket such that the first side guide wheel is allowed to move relative to the first wheel bracket in the first horizontal direction.

In embodiments, the transfer apparatus further includes a first wheel connection block to which a rotation shaft of the first side guide wheel is coupled, a first bolt which is inserted into a through-hole of the first wheel connection block and coupled to the first wheel bracket, and a spring which is provided inside the through-hole of the first wheel connection block to surround a side surface of the first bolt and is configured to elastically support the first wheel connection block in the first horizontal direction.

In embodiments, the transfer apparatus further includes a bush provided on the side surface of the first bolt to support one end of the spring, and a washer provided on the side surface of the first bolt to support the other end of the spring.

In embodiments, the second side guide wheel is mounted to the second wheel bracket such that the second side guide wheel is not allowed to move relative to the second wheel bracket in the first horizontal direction.

In embodiments, the transfer apparatus further includes a second wheel connection block to which a rotation shaft of the second side guide wheel is coupled, and a second bolt which is inserted into a through-hole of the second wheel connection block and couples the second wheel connection block to the second wheel bracket.

In embodiments, at least one of the first front guide wheel and the first rear guide wheel is mounted to the first wheel bracket such that the at least one of the first front guide wheel and the first rear guide wheel is allowed to move relative to the first wheel bracket in a second horizontal direction perpendicular to the first horizontal direction, and at least one of the second front guide wheel and the second rear guide wheel is mounted to the second wheel bracket such that the at least one of the second front guide wheel and the second rear guide wheel is allowed to move relative to the second wheel bracket in the second horizontal direction.

In embodiments, the main rail includes a linear motor coil to which electric power is applied, and the moving block includes a linear motor magnet.

According to another aspect of the disclosure, a transfer apparatus includes a first guide rail including a first side surface, a first front surface, and a first rear surface, a second guide rail including a second side surface, a second front surface, and a second rear surface, a driving module including a main rail and a moving block that moves along the main rail, wherein the main rail is provided between the first guide rail and the second guide rail in a first horizontal direction, and a carriage module coupled to the moving block and supporting an article, wherein the carriage module includes a carriage frame coupled to the moving block, a first wheel assembly including a first wheel bracket coupled to one side of the carriage module and a first side guide wheel mounted to the first wheel bracket and configured to be in rolling contact with the first side surface of the first guide rail, and a second wheel assembly including a second wheel bracket coupled to the other side of the carriage module and a second side guide wheel mounted to the second wheel bracket and configured to be in rolling contact with the second side surface of the second guide rail.

In embodiments, the first side guide wheel is mounted to the first wheel bracket such that the first side guide wheel is allowed to move relative to the first wheel bracket in the first horizontal direction, and the second side guide wheel is mounted to the second wheel bracket such that the second side guide wheel is not allowed to move relative to the second wheel bracket in the first horizontal direction.

In embodiments, the first side guide wheel is elastically supported by a spring and brought into close contact with the first side surface of the first guide rail.

In embodiments, the first wheel assembly further includes at least one first additional side guide wheel which is mounted to the first wheel bracket and configured to be in rolling contact with the first side surface of the first guide rail, and the second wheel assembly further includes at least one second additional side guide wheel which is mounted to the second wheel bracket and configured to be in rolling contact with the second side surface of the second guide rail.

In embodiments, the first wheel assembly further includes: a first front guide wheel which is mounted to the first wheel bracket and configured to be in rolling contact with the first front surface of the first guide rail, and a first rear guide wheel which is mounted to the first wheel bracket and configured to be in rolling contact with the first rear surface of the first guide rail, wherein the second wheel assembly further includes a second front guide wheel which is mounted to the second wheel bracket and configured to be in rolling contact with the second front surface of the second guide rail, and a second rear guide wheel which is mounted to the second wheel bracket and configured to be in rolling contact with the second rear surface of the second guide rail.

In embodiments, each of the first guide rail, the second guide rail, and the main rail extends in a vertical direction, each of the first front guide wheel, the first rear guide wheel, the second front guide wheel, and the second rear guide wheel is configured to rotate about the first horizontal direction, and wherein each of the first side guide wheel and the second side guide wheel is configured to rotate about a second horizontal direction perpendicular to the first horizontal direction.

In embodiments, at least one of the first front guide wheel and the first rear guide wheel is mounted to the first wheel bracket such that the at least one of the first front guide wheel and the first rear guide wheel is allowed to move relative to the first wheel bracket in the second horizontal direction, and at least one of the second front guide wheel and the second rear guide wheel is mounted to the second wheel bracket such that the at least one of the second front guide wheel and the second rear guide wheel is allowed to move relative to the second wheel bracket in the second horizontal direction.

According to another aspect of the disclosure, a transfer apparatus includes a first guide rail including a first side surface, a first front surface, and a first rear surface and extending in a vertical direction, a second guide rail including a second side surface, a second front surface, and a second rear surface and extending in the vertical direction, a driving module including a main rail that extends in the vertical direction and a moving block that moves along the main rail, wherein the main rail is provided between the first guide rail and the second guide rail in a first horizontal direction, and a carriage module coupled to the moving block and supporting an article, wherein the carriage module includes a carriage frame coupled to the moving block, a first wheel assembly coupled to the carriage frame, the first wheel assembly including a plurality of first side guide wheels configured to be in rolling contact with the first side surface of the first guide rail, a first front guide wheel configured to be in rolling contact with the first front surface of the first guide rail, a first rear guide wheel configured to be in rolling contact with the first rear surface of the first guide rail, and a first wheel bracket to which the plurality of first side guide wheels, the first front guide wheel, and the first rear guide wheel are mounted, and a second wheel assembly coupled to the carriage frame, the second wheel assembly including a plurality of second side guide wheels configured to be in rolling contact with the second side surface of the second guide rail, a second front guide wheel configured to be in rolling contact with the second front surface of the second guide rail, a second rear guide wheel configured to be in rolling contact with the second rear surface of the second guide rail, and a second wheel bracket to which the plurality of second side guide wheels, the second front guide wheel, and the second rear guide wheel are mounted, wherein the driving module includes a linear motor configured to move the carriage module through an interaction between a linear motor coil provided in the main rail and a linear motor magnet provided in the moving block, each of the plurality of first side guide wheels is mounted to the first wheel bracket such that the first side guide wheel is allowed to move relative to the first wheel bracket in the first horizontal direction, each of the plurality of second side guide wheels is mounted to the second wheel bracket such that the second side guide wheel is not allowed to move relative to the second wheel bracket in the first horizontal direction, and the number of the plurality of first side guide wheels is the same as the number of the plurality of second side guide wheels.

In embodiments, each of the plurality of first side guide wheels is elastically supported by a spring and brought into close contact with the first side surface of the first guide rail.

In embodiments, one of the first front guide wheel and the first rear guide wheel is mounted to the first wheel bracket such that the one of the first front guide wheel and the first rear guide wheel is allowed to move relative to the first wheel bracket in a second horizontal direction perpendicular to the first horizontal direction, the other one of the first front guide wheel and the first rear guide wheel is mounted to the first wheel bracket such that the other one of the first front guide wheel and the first rear guide wheel is not allowed to move relative to the first wheel bracket in the second horizontal direction, one of the second front guide wheel and the second rear guide wheel is mounted to the second wheel bracket such that the one of the second front guide wheel and the second rear guide wheel is allowed to move relative to the second wheel bracket in the second horizontal direction, and the other one of the second front guide wheel and the second rear guide wheel is mounted to the second wheel bracket such that the other one of the second front guide wheel and the second rear guide wheel is not allowed to move relative to the second wheel bracket in the second horizontal direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
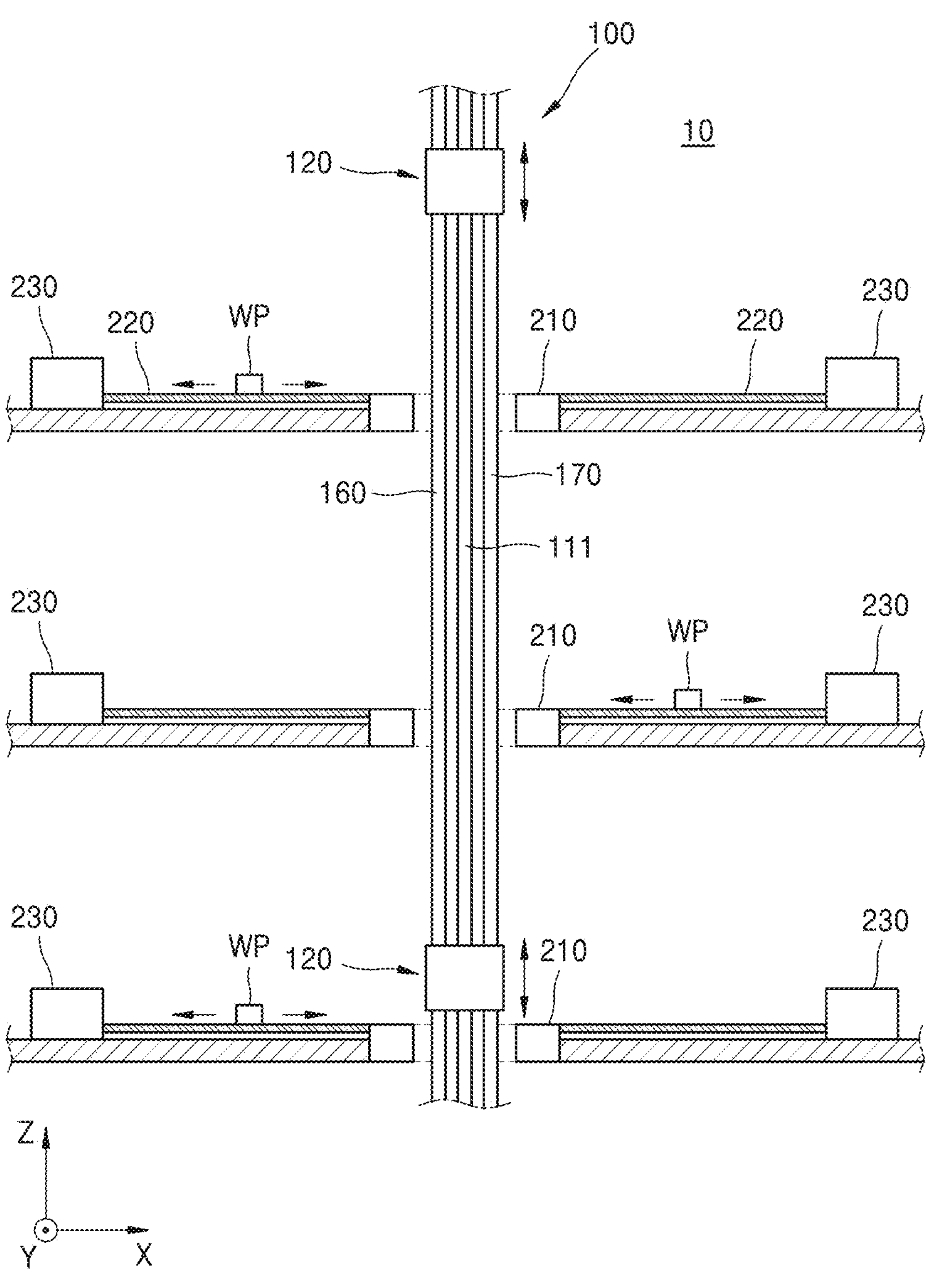
FIG. 1 is a schematic diagram showing a transfer apparatus according to embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments according to the technical idea of the disclosure will be described in detail with reference to the accompanying drawings. The same reference numerals are used for the same components in the drawings, and duplicate descriptions thereof are omitted.

FIG. 1 is a schematic diagram showing a transfer apparatus 10 according to embodiments.

Referring to FIG. 1, the transfer apparatus 10 may be configured to transfer an article WP. In embodiments, the transfer apparatus 10 is provided in semiconductor manufacturing equipment, and may be configured to transfer the article WP in the semiconductor manufacturing equipment. For example, the article WP may include a substrate used to manufacture semiconductor elements. For example, the article WP may include a wafer. For example, the article WP may include a container for accommodating a substrate. For example, the article WP may include one of a front open unified pod (FOUP) configured to accommodate a plurality of substrates, a magazine configured to accommodate a plurality of substrates, and a tray configured to accommodate a plurality of substrates.

The transfer apparatus 10 is provided in a semiconductor manufacturing equipment having a multi-floor structure, and may be configured to transfer the article WP to each floor of the semiconductor manufacturing equipment or between floors of the semiconductor manufacturing equipment. For example, as illustrated in FIG. 1, the semiconductor manufacturing equipment may have the 1st, 2nd, and 3rd floors positioned at different levels in a vertical direction (Z direction). The transfer apparatus 10 may transfer the article WP to each floor of the semiconductor manufacturing equipment in a vertical direction (Z direction) and transfer the article WP within each floor of the semiconductor manufacturing equipment.

The transfer apparatus 10 may include a tower lift device 100, a stage module 210, a sub transfer module 220, and an article storage 230. The tower lift device 100 is responsible for transferring the article WP in the vertical direction (Z direction), and may transfer the article WP to target floor of the semiconductor manufacturing equipment. The stage module 210 is provided on each floor of the semiconductor manufacturing equipment, and may be configured to exchange the article WP with the tower lift device 100. The sub transfer module 220 is provided in each floor of the semiconductor manufacturing equipment, and may be configured to transfer the article WP within each floor of the semiconductor manufacturing equipment. The article storage 230 may be provided on each floor of the semiconductor manufacturing equipment. In some embodiments, the article storage 230 may include a processing chamber configured to process a substrate (e.g., etch, deposit, clean, etc.). The sub transfer module 220 may be configured to transfer the article WP between the article storage 230 and the stage module 210 provided on each floor of the semiconductor manufacturing equipment. The sub transfer module 220 may include, for example, a transfer rail and a support unit movably installed on the transfer rail and supporting the article WP.

Figure 2:
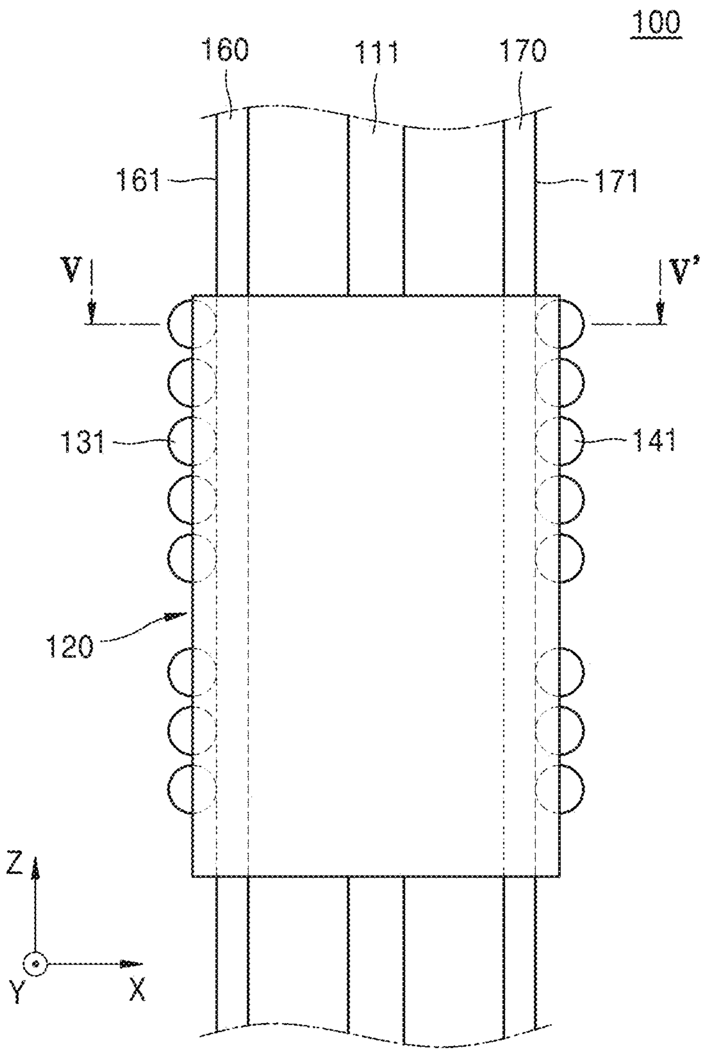
FIGS. 2 to 4 are side views of a tower lift device according to embodiments when viewed in different directions.
Figure 3:
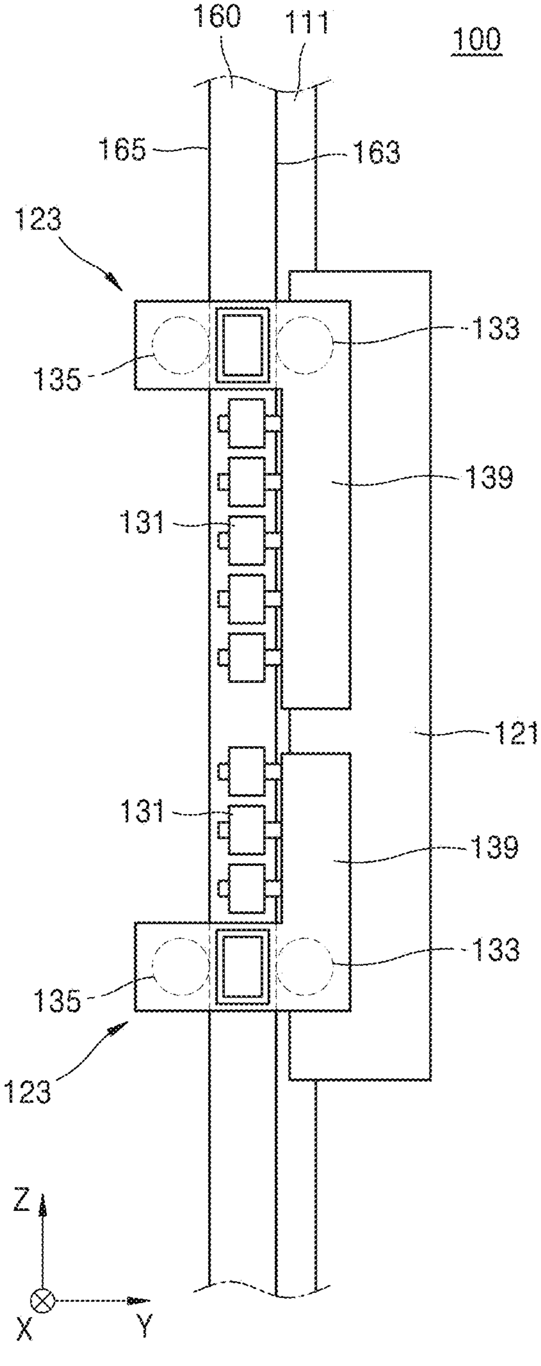
Figure 4:
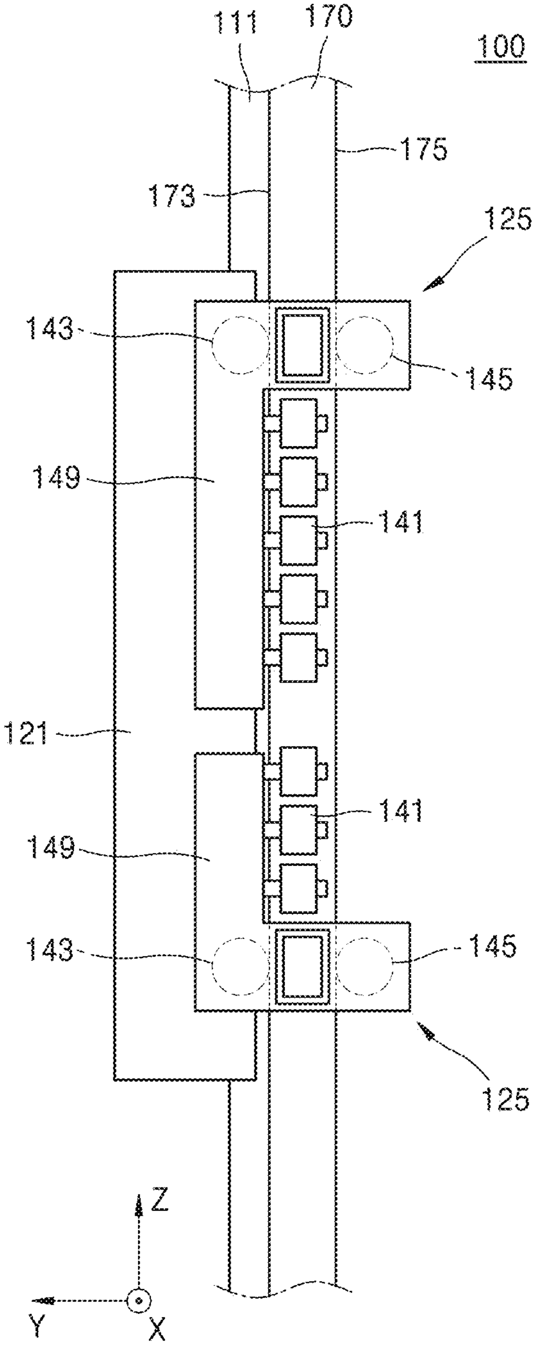
Figure 5:
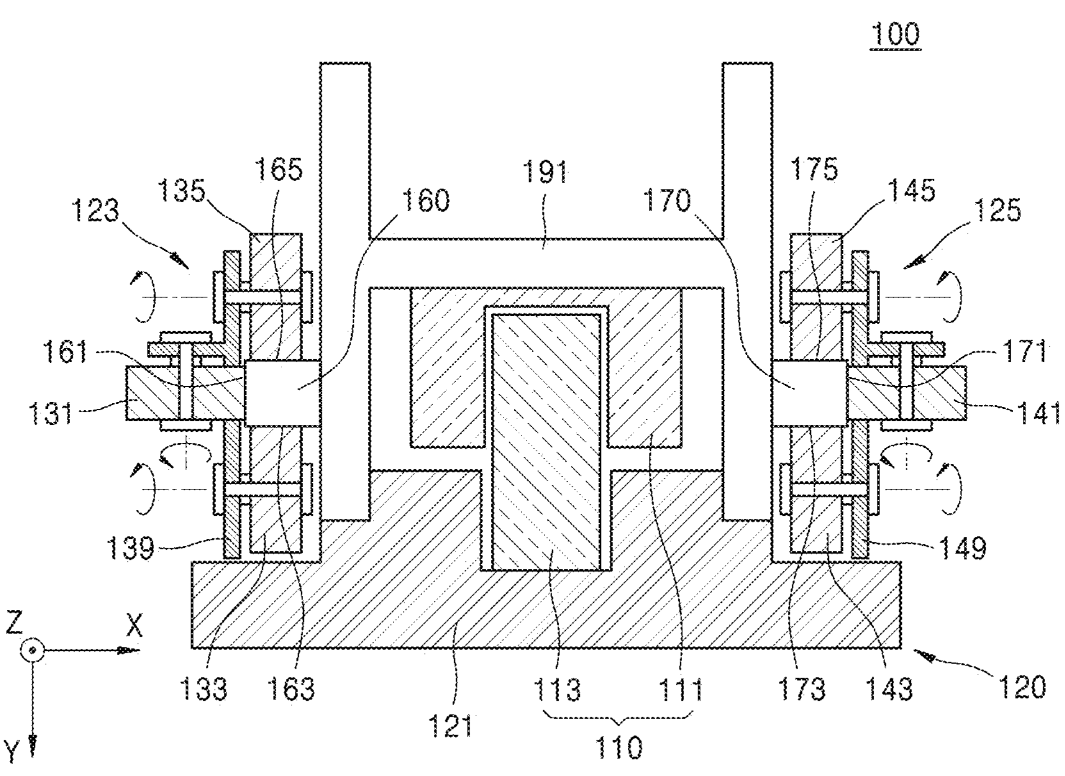
FIG. 5 is a cross-sectional view taken along line V-V' of FIG. 2.

FIGS. 2 to 5 are views showing the tower lift device 100 according to embodiments. FIGS. 2 to 4 are side views of the tower lift device 100 when viewed in different directions, and FIG. 5 is a cross-sectional view taken along line V-V' of FIG. 2.

Referring to FIGS. 1 to 5, the tower lift device 100 may include a driving module 110, a carriage module 120, a first guide rail 160, and a second guide rail 170.

The driving module 110 may move the carriage module 120. The driving module 110 may include a main rail 111 and a moving block 113. The main rail 111 may extend in the vertical direction (Z direction). The moving block 113 may be movably installed on the main rail 111, and may be configured to move along the main rail 111. The main rail 111 has a groove extending in an extension direction thereof, and a portion of the moving block 113 may be accommodated in the groove of the main rail 111. The driving module 110 may be configured to receive electric power from the outside and use the electric power supplied from the outside to generate a driving force for moving the carriage module 120. The driving module 110 may be formed by a linear motor. In embodiments, the driving module 110 may be formed by a core-type linear motor.

In embodiments, the driving module 110 is formed by the linear motor. Also, the main rail 111 may constitute a stator of the linear motor, and the moving block 113 may constitute a mover of the linear motor. The main rail 111 may include a linear motor coil, and the moving block 113 may include a linear motor magnet that interacts with the linear motor coil. The moving block 113 may be moved in the vertical direction (Z direction) by magnetic force generated through an interaction between the linear motor coil and the linear motor magnet. That is, when electric power is applied to the linear motor coil, propulsion for moving the moving block 113 in the vertical direction (Z direction) may be generated by an attractive force and a repulsive force generated through the interaction between the linear motor coil and the linear motor magnet.

The first guide rail 160 and the second guide rail 170 may be configured to guide the movement of the carriage module 120 moved by the driving module 110. Each of the first guide rail 160 and the second guide rail 170 may extend in a direction parallel to the extension direction of the main rail 111 (i.e., the vertical direction (Z direction)), and the first guide rail 160 and the second guide rail 170 may be spaced apart from each other in a first horizontal direction (X direction) with the main rail 111 therebetween. That is, the first guide rail 160 may be provided on one side (e.g., left side) of the main rail 111, and the second guide rail 170 may be provided on the other side thereof (e.g., right side). The main rail 111 may be provided between the first guide rail 160 and the second guide rail 170 in the first horizontal direction (X direction). As illustrated in the FIG. 5, the first guide rail 160, the second guide rail 170, and the main rail 111 may be connected to and supported by the same frame 191.

Each of the first guide rail 160 and the second guide rail 170 may have a quadrangular pillar shape, and may provide surfaces for guiding guide wheels of the carriage module 120, which will be described later. A first side surface 161, a first front surface 163, and a first rear surface 165 of the first guide rail 160 may be in rolling contact with corresponding guide wheels of the carriage module 120. The second side surface 171, the second front surface 173, and the second rear surface 175 of the second guide rail 170 may be in rolling contact with corresponding guide wheels of the carriage module 120. Here, each of the first side surface 161, the first front surface 163, and the first rear surface 165 of the first guide rail 160 may be flat, and each of the second side surface 171, the second front surface 173, and the second rear surface 175 of the second guide rail 170 may be flat. The first side surface 161 of the first guide rail 160 and the second side surface 171 of the second guide rail 170 may be parallel to each other and perpendicular to the first horizontal direction (X direction). The first front surface 163 and the first rear surface 165 of the first guide rail 160 may be parallel to each other and perpendicular to a second horizontal direction (Y direction). Also, the second front surface 173 and the second rear surface 175 of the second guide rail 170 may be parallel to each other and perpendicular to the second horizontal direction (Y direction).

The carriage module 120 may be configured to support the article WP and be moved in the vertical direction (Z direction) by the driving module 110. The carriage module 120 may include a carriage frame 121 to which the article WP is mounted, a first wheel assembly 123 which is connected to one side portion of the carriage frame 121 and includes one or more guide wheels in rolling contact with the first guide rail 160, and a second wheel assembly 125 which is connected to the other side portion of the carriage frame 121 and includes one or more guide wheels in rolling contact with the second guide rail 170.

The carriage frame 121 may include a structure configured to support the article WP. For example, the carriage frame 121 may include one or more shelves configured to support the article WP. In some embodiments, the carriage frame 121 may include a robot configured to grip and hold the article WP. The carriage frame 121 may be coupled and fixed to the moving block 113. The carriage frame 121 is coupled and fixed to the moving block 113, and thus, when the moving block 113 moves, the carriage frame 121 may move together with the moving block 113.

The first wheel assembly 123 may include a first wheel bracket 139 coupled to one side portion of the carriage frame 121, one or more first side guide wheels 131 configured to be in rolling contact with the first side surface 161 of the first guide rail 160, one or more first front guide wheels 133 configured to be in rolling contact with the first front surface 163 of the first guide rail 160, and one or more first rear guide wheels 135 configured to be in rolling contact with the first rear surface 165 of the first guide rail 160.

Each of the first side guide wheels 131, the first front guide wheels 133, and the first rear guide wheels 135 may be rotatably mounted to the first wheel bracket 139. The first side guide wheel 131 may rotate about the second horizontal direction (Y direction), and each of the first front guide wheel 133 and the first rear guide wheel 135 may rotate about the first horizontal direction (X direction). That is, the rotation axis of the first side guide wheel 131 may be parallel to the second horizontal direction (Y direction), and each of the rotation axis of the first front guide wheel 133 and the rotation axis of the first rear guide wheel 135 may be parallel to the first horizontal direction (X direction). The first front guide wheel 133 and the first rear guide wheel 135 may be spaced apart from each other in the second horizontal direction (Y direction) with the first guide rail 160 therebetween and aligned with each other in the second horizontal direction (Y direction). In the first wheel assembly 123, the number of first front guide wheels 133 may be the same as the number of first rear guide wheels 135.

The second wheel assembly 125 may include a second wheel bracket 149 coupled to the other side portion of the carriage frame 121, one or more second side guide wheels 141 configured to be in rolling contact with the second side surface 171 of the second guide rail 170, one or more second front guide wheels 143 configured to be in rolling contact with the second front surface 173 of the second guide rail 170, and one or more second rear guide wheels 145 configured to be in rolling contact with the second rear surface 175 of the second guide rail 170.

Each of the second side guide wheels 141, the second front guide wheels 143, and the second rear guide wheels 145 may be rotatably mounted to the second wheel bracket 149. The second side guide wheel 141 may rotate about the second horizontal direction (Y direction), and each of the second front guide wheel 143 and the second rear guide wheel 145 may rotate about the first horizontal direction (X direction). That is, the rotation axis of the second side guide wheel 141 may be parallel to the second horizontal direction (Y direction), and each of the rotation axis of the second front guide wheel 143 and the rotation axis of the second rear guide wheel 145 may be parallel to the first horizontal direction (X direction). The second side guide wheel 141 and the first side guide wheel 131 may be aligned with each other in the first horizontal direction (X direction). In one carriage module 120, the number of second side guide wheels 141 may be the same as the number of first side guide wheels 131. The second front guide wheel 143 and the second rear guide wheel 145 may be spaced apart from each other in the second horizontal direction (Y direction) with the second guide rail 170 therebetween and aligned with each other in the second horizontal direction (Y direction). In the second wheel assembly 125, the number of second front guide wheels 143 may be the same as the number of second rear guide wheels 145.

According to embodiments, while the carriage module 120 is moved by the driving module 110, an external force acting on the carriage module 120 in the first horizontal direction (X direction) may be cancelled or alleviated by the first side guide wheel 131 and the second side guide wheel 141. Accordingly, the carriage module 120 can travel stably. More specifically, when electric power is applied to the driving module 110 to move the carriage module 120, the attractive force in the lateral direction (i.e., the first horizontal direction (X direction)) is generated between the main rail 111 having the linear motor coil and the moving block 113 having the linear motor magnet. This attractive force is cancelled or alleviated by the first side guide wheel 131 and the second side guide wheel 141 symmetrically arranged in the first horizontal direction (X direction) with respect to the main rail 111, and thus, the carriage module 120 can travel stably.

Furthermore, according to embodiments, while the carriage module 120 is moved by the driving module 110, an external force acting on the carriage module 120 in the second horizontal direction (Y direction) may be cancelled or alleviated by the first front guide wheel 133 and the first rear guide wheel 135 guided by the first guide rail 160 and the second front guide wheel 143 and the second rear guide wheel 145 guided by the second guide rail 170. Accordingly, the carriage module 120 can travel stably.

The first wheel assembly 123 may include a plurality of first side guide wheels 131 mounted to the first wheel bracket 139, and the second wheel assembly 125 may include a plurality of second side guide wheels 141 mounted to the second wheel bracket 149. The plurality of first side guide wheels 131 are arranged in a direction in which the first guide rail 160 extends, and may be configured to be in rolling contact with the first side surface 161 of the first guide rail 160. The plurality of second side guide wheels 141 are arranged in a direction in which the second guide rail 170 extends, and may be configured to be in rolling contact with the second side surface 171 of the second guide rail 170. In one carriage module 120, the number of the plurality of first side guide wheels 131 may be the same as the number of the plurality of second side guide wheels 141.

The carriage module 120 may include one or more first wheel assemblies 123 and one or more second wheel assemblies 125. In embodiments, the carriage module 120 may include the plurality of first wheel assemblies 123 spaced apart from each other in the direction in which the first guide rail 160 extends and the plurality of second wheel assemblies 125 spaced apart from each other in the direction in which the second guide rail 170 extends. An allowable load of the carriage module 120 in the first horizontal direction (X direction) is determined by the total number of first side guide wheels 131 and the total number of second side guide wheels 141 provided in the carriage module 120. The total number of first side guide wheels 131 and the total number of second side guide wheels 141 provided in the carriage module 120 may be determined such that the allowable load of the carriage module 120 in the first horizontal direction (X direction) has a greater value than the attractive force generated in the first horizontal direction (X direction) by the driving module 110.

In embodiments, each of the first side guide wheels 131 and the second side guide wheels 141 may be configured to move within a target range in the first horizontal direction (X direction). The first side guide wheel 131 may be mounted to the first wheel bracket 139 such that the first side guide wheel 131 is allowed to move relative to the first wheel bracket 139 in the first horizontal direction (X direction), and the second side guide wheel 141 may be mounted to the second wheel bracket 149 such that the second side guide wheel 141 is allowed to move relative to the second wheel bracket 149 in the first horizontal direction (X direction). In embodiments, each of the first side guide wheel 131 and the second side guide wheel 141 may be configured to be movable within the target range in the first horizontal direction (X direction) by a restoring force provided from an elastic body. In embodiments, the first side guide wheel 131 may be elastically supported by the elastic body in the lateral direction from the first guide rail 160 toward the main rail 111, and may be brought into close contact with the first side surface 161 of the first guide rail 160 by the restoring force provided from the elastic body. In embodiments, the second side guide wheel 141 may be elastically supported by the elastic body in the lateral direction from the second guide rail 170 toward the main rail 111, and may be brought into close contact with the second side surface 171 of the second guide rail 170 by the restoring force provided from the elastic body. In embodiments, the first side guide wheel 131 may be mounted to the first wheel bracket 139 such that the first side guide wheel 131 is allowed to move relative to the first wheel bracket 139 in the first horizontal direction (X direction), and the second side guide wheel 141 may be mounted to the second wheel bracket 149 such that the second side guide wheel 141 is not allowed to move relative to the second wheel bracket 149 in the first horizontal direction (X direction). According to embodiments, at least one of the first side guide wheel 131 and the second side guide wheel 141 is configured to move in the first horizontal direction (X direction) within the target range, and thus, it is possible to prevent the carriage module 120 from jamming or the like when moving, due to machining errors of components, deformations of components, and/or assembly errors between components.

In embodiments, each of the first front guide wheel 133 and the first rear guide wheel 135 may be configured to move within a target range in the second horizontal direction (Y direction). The first front guide wheel 133 may be mounted to the first wheel bracket 139 such that the first front guide wheel 133 is allowed to move relative to the first wheel bracket 139 in the second horizontal direction (Y direction), and the first rear guide wheel 135 may be mounted to the first wheel bracket 139 such that the first rear guide wheel 135 is allowed to move relative to the first wheel bracket 139 in the second horizontal direction (Y direction). In embodiments, each of the first front guide wheel 133 and the first rear guide wheel 135 may be configured to be movable within the target range in the second horizontal direction (Y direction) by a restoring force provided from an elastic body. In embodiments, the first front guide wheel 133 may be elastically supported by the elastic body in the lateral direction from the first front surface 163 of the first guide rail 160 toward the first rear surface 165 thereof, and may be brought into close contact with the first front surface 163 of the first guide rail 160 by the restoring force provided from the elastic body. In embodiments, the first rear guide wheel 135 may be elastically supported by the elastic body in the lateral direction from the first rear surface 165 of the first guide rail 160 toward the first front surface 163 thereof, and may be brought into close contact with the first rear surface 165 of the first guide rail 160 by the restoring force provided from the elastic body. In embodiments, one of the first front guide wheel 133 and the first rear guide wheel 135 may be mounted to the first wheel bracket 139 such that the one is allowed to move relative to the first wheel bracket 139 in the second horizontal direction (Y direction), and the other one of the first front guide wheel 133 and the first rear guide wheel 135 may be mounted to the first wheel bracket 139 such that the other one is not allowed to move relative to the first wheel bracket 139 in the second horizontal direction (Y direction). According to embodiments, at least one of the first front guide wheel 133 and the first rear guide wheel 135 is configured to move in the second horizontal direction (Y direction) within the target range, and thus, it is possible to prevent the carriage module 120 from jamming or the like when moving, due to machining errors of components, deformations of components, and/or assembly errors between components.

In embodiments, each of the second front guide wheel 143 and the second rear guide wheel 145 may be configured to move within a target range in the second horizontal direction (Y direction). The second front guide wheel 143 may be mounted to the second wheel bracket 149 such that the second front guide wheel 143 is allowed to move relative to the second wheel bracket 149 in the second horizontal direction (Y direction), and the second rear guide wheel 145 may be mounted to the second wheel bracket 149 such that the second rear guide wheel 145 is allowed to move relative to the second wheel bracket 149 in the second horizontal direction (Y direction). In embodiments, each of the second front guide wheel 143 and the second rear guide wheel 145 may be configured to be movable within the target range in the second horizontal direction (Y direction) by a restoring force provided from an elastic body. In embodiments, the second front guide wheel 143 may be elastically supported by the elastic body in the lateral direction from the second front surface 173 of the second guide rail 170 toward the second rear surface 175 thereof, and may be brought into close contact with the second front surface 173 of the second guide rail 170 by the restoring force provided from the elastic body. The second rear guide wheel 145 may be elastically supported by the elastic body in the lateral direction from the second rear surface 175 of the second guide rail 170 toward the second front surface 173 thereof, and may be brought into close contact with the second rear surface 175 of the second guide rail 170 by the restoring force provided from the elastic body. In embodiments, one of the second front guide wheel 143 and the second rear guide wheel 145 may be mounted to the second wheel bracket 149 such that the one is allowed to move relative to the second wheel bracket 149 in the second horizontal direction (Y direction), and the other one of the second front guide wheel 143 and the second rear guide wheel 145 may be mounted to the second wheel bracket 149 such that the other one is not allowed to move relative to the second wheel bracket 149 in the second horizontal direction (Y direction). According to embodiments, at least one of the second front guide wheel 143 and the second rear guide wheel 145 is configured to move in the second horizontal direction (Y direction) within the target range, and thus, it is possible to prevent the carriage module 120 from jamming or the like when moving, due to machining errors of components, deformations of components, and/or assembly errors between components.

Figure 6:
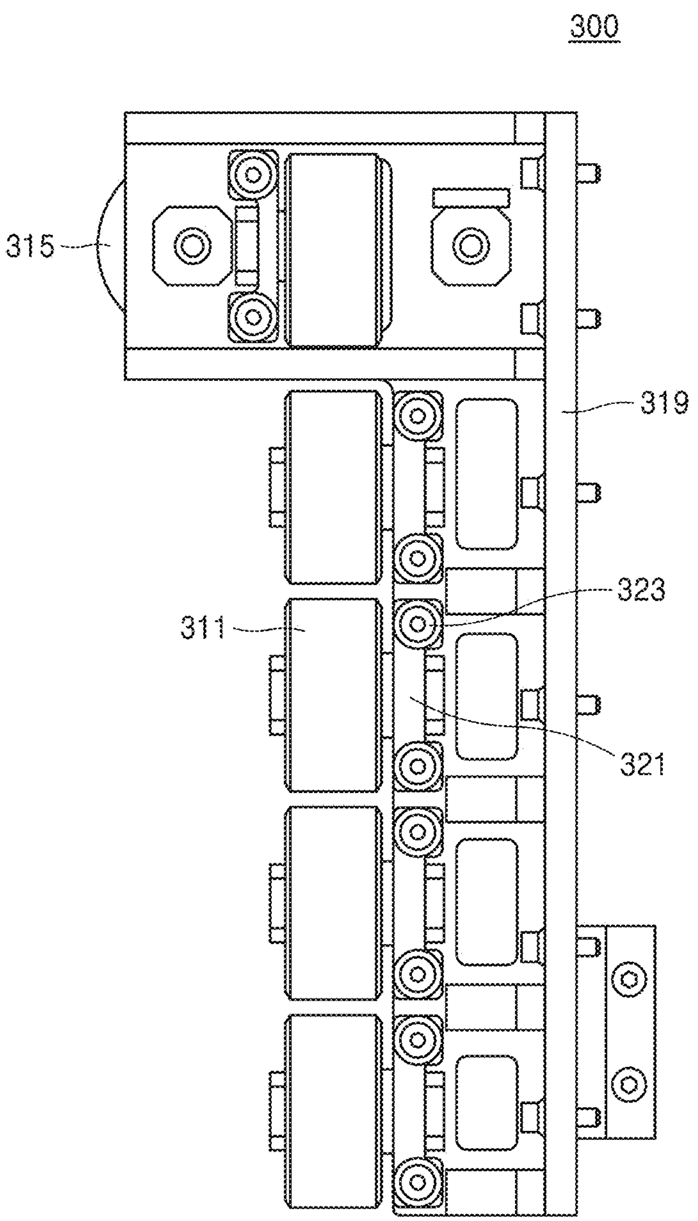
FIGS. 6 and 7 are side views of a wheel assembly of a carriage module according to embodiments when viewed in different directions.
Figure 7:
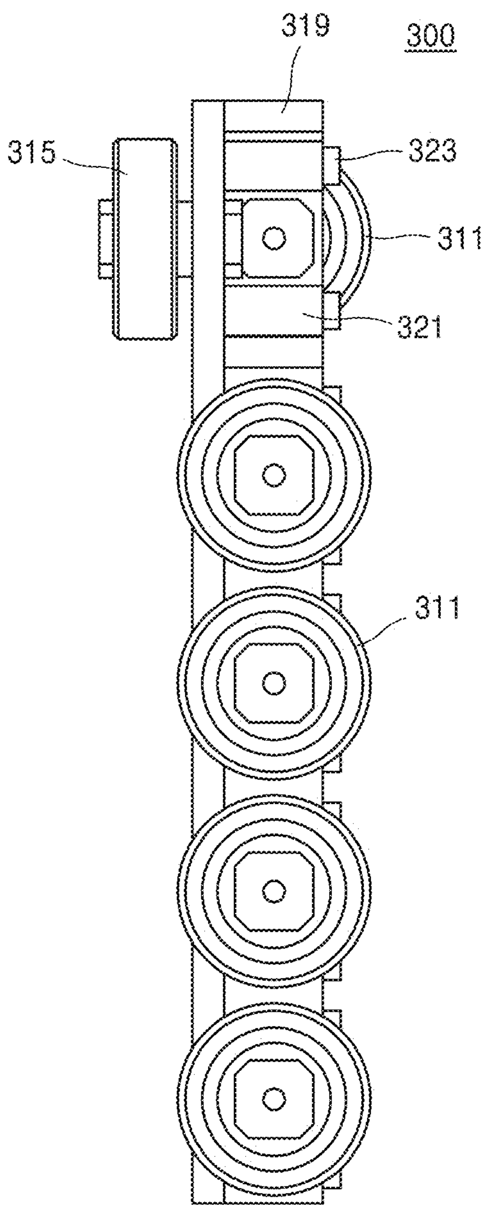
Figure 8:
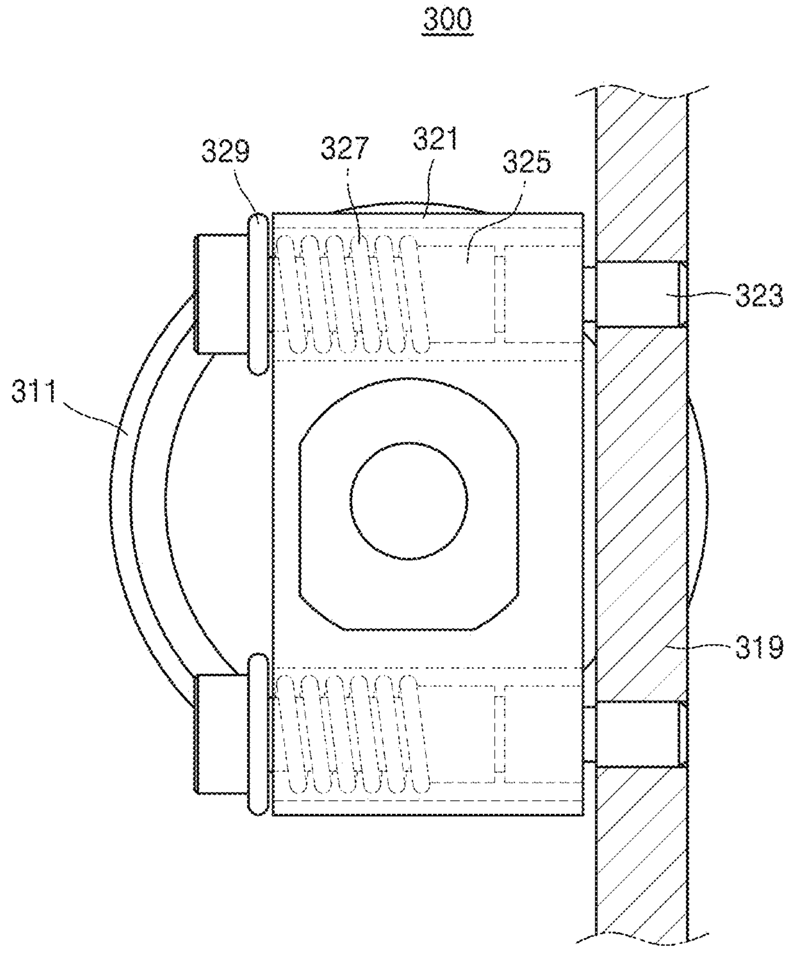
FIG. 8 is a cross-sectional view showing a portion of the wheel assembly of the carriage module.

FIGS. 6 to 8 are views showing a wheel assembly 300 of a carriage module according to embodiments. FIGS. 6 and 7 are side views of the wheel assembly 300 of the carriage module according to embodiments when viewed in different directions, and FIG. 8 is a cross-sectional view showing a portion of the wheel assembly 300 of the carriage module.

The wheel assembly 300 shown in FIGS. 6 to 8 may correspond to the first wheel assembly 123 and/or the second wheel assembly 125 of the carriage module 120 described with reference to FIGS. 1 to 5.

Referring to FIGS. 6 to 8 together with FIGS. 1 to 5, a side guide wheel 311 in the wheel assembly 300 may be movably mounted to a wheel bracket 319 by a first wheel connection block 321 that is movable with a target range. The side guide wheel 311 may be mounted to the wheel bracket 319 by the first wheel connection block 321 such that the side guide wheel 311 is allowed to move relative to the wheel bracket 319 in a lateral direction. A relative distance between the side guide wheel 311 and the wheel bracket 319 (or a relative distance between the first wheel connection block 321 and the wheel bracket 319) may be configured to be variable. For example, the side guide wheel 311 may be configured to be movable relative to the wheel bracket 319 in a lateral direction within a target range (e.g., between about 0.1 mm and about 5 mm).

More specifically, the rotation shaft of the side guide wheel 311 may be inserted and coupled to the center of the first wheel connection block 321. The first wheel connection block 321 has a through-hole that passes through the first wheel connection block 321 in the lateral direction, and a first bolt 323 may be inserted into the through-hole of the first wheel connection block 321 and fastened to the wheel bracket 319. As screw threads provided at the end portion of the first bolt 323 engage with screw threads of the wheel bracket 319, the first bolt 323 may be coupled to the wheel bracket 319. For example, the first bolt 323 may include a shoulder bolt. A bush 325 having a cylindrical shape and a washer 329 having a ring shape may be provided on a side surface of the first bolt 323, and a spring 327 may be provided between the washer 329 and the bush 325. The washer 329 may be provided outside the first wheel connection block 321, and may be provided between the first wheel connection block 321 and a head of the first bolt 323. For example, the spring 327 may include a coil spring having a structure that surrounds the side surface of the first bolt 323. One end of the spring 327 may be supported by the bush 325, and the other end of the spring 327 may be supported by the washer 329. The spring 327 may be configured to elastically support the side guide wheel 311 in the lateral direction. The spring 327 may elastically support the side guide wheel 311 and the first wheel connection block 321 coupled thereto in a direction in which the side guide wheel 311 is brought into close contact with a corresponding guide rail. For example, when the wheel assembly 300 includes the first wheel assembly 123 that includes the guide wheels in rolling contact with the first guide rail 160 illustrated in FIGS. 2 to 5, the spring 327 provides the restoring force to press the first wheel connection block 321 and the side guide wheel 311 coupled to the first wheel connection block 321 in an inward direction (e.g., a horizontal direction from the first guide rail 160 toward the second guide rail 170). Accordingly, the side guide wheel 311 elastically supported by the spring 327 may be brought into close contact with the first guide rail 160.

While the carriage module 120 moves vertically, an external force may be applied to the side guide wheel 311 in an outward direction (e.g., a direction from the main rail 111 toward the first guide rail 160 or in a direction from the main rail 111 toward the second guide rail 170), due to deformations and/or assembly errors of the guide rails. Accordingly, there is a risk that the side guide wheel 311 is pushed outward due to this external force. However, according to embodiments, the restoring force provided by the spring 327 overcomes the external force acting in the outward direction, and thus, it is possible to maintain contact between the side guide wheel 311 and the corresponding guide rail. In addition, when a distance between the first guide rail 160 and the second guide rail 170 is greater than a reference value in a specific region due to the deformations and/or assembly errors of the guide rails, the carriage module 120 is stuck in the guide rails and cannot move. Accordingly, there is a risk that a jamming phenomenon occurs. However, according to embodiments, the side guide wheel 311 and the first wheel connection block 321 connected thereto are configured to be movable relative to the wheel bracket 319, and thus, it is possible to prevent the jamming phenomenon between the carriage module 120 and the guide rails.

In addition, in the wheel assembly 300, a front guide wheel (e.g., the first front guide wheel 133 or the second front guide wheel 143) and a rear guide wheel 315 (e.g., the first rear guide wheel 135 or the second rear guide wheel 145) may also be configured to be movable relative to the wheel bracket 319. In this case, the movement of the front guide wheel relative to the wheel bracket 319 and the movement of the rear guide wheel relative to the wheel bracket 319 may be made in substantially the same configuration as the configuration for moving the side guide wheel 311 relative to the wheel bracket 319. In short, a rotation shaft of the front guide wheel is connected to a wheel connection block, and a bolt inserted into a through-hole of the wheel connection block is fixed to the wheel bracket 319. Also, a spring may be provided inside the through-hole of the wheel connection block to surround the bolt between a bush and a washer, and the front guide wheel and the wheel connection block connected thereto may be elastically supported by the spring in a direction in which the front guide wheel and the wheel connection block are brought into contact with the corresponding guide rail. Similarly, a rotation shaft of the rear guide wheel is connected to a wheel connection block, and a bolt inserted into a through-hole of the wheel connection block is fixed to the wheel bracket 319. Also, a spring may be provided inside the through-hole of the wheel connection block to surround the bolt between a bush and a washer, and the rear guide wheel and the wheel connection block connected thereto may be elastically supported by the spring in a direction in which the rear guide wheel and the wheel connection block are brought into contact with the corresponding guide rail.

Figure 9:
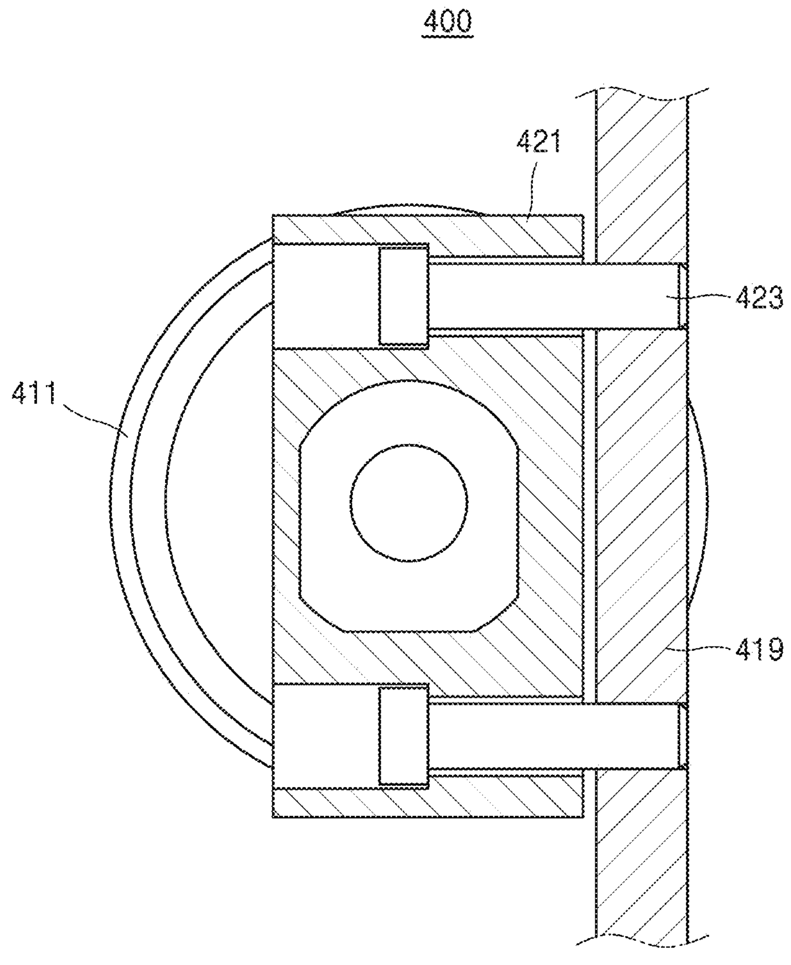
FIG. 9 is a cross-sectional view showing a portion of a wheel assembly of a carriage module according to embodiments.

FIG. 9 is a cross-sectional view showing a portion of a wheel assembly 400 of a carriage module according to embodiments.

The wheel assembly 400 shown in FIG. 9 may correspond to the first wheel assembly 123 and/or the second wheel assembly 125 described with reference to FIGS. 1 to 5.

Referring to FIG. 9 together with FIGS. 1 to 5, a guide wheel 411 in the wheel assembly 400 may be mounted to a wheel bracket 419 by a second wheel connection block 421 which is a fixed-type, and the guide wheel 411 may be mounted to the wheel bracket 419 such that the guide wheel 411 is not allowed to move relative to the wheel bracket 419. A relative distance between the guide wheel 411 and the wheel bracket 419 (or a relative distance between the second wheel connection block 421 and the wheel bracket 419) may be configured to be maintained constant. More specifically, a rotation shaft of the guide wheel 411 may be inserted and connected to the center of the second wheel connection block 421. The second wheel connection block 421 has a through-hole that passes through the second wheel connection block 421 in a lateral direction, and a second bolt 423 may be inserted into the through-hole of the second wheel connection block 421 and fastened to the wheel bracket 419. As screw threads provided at the end of the second bolt 423 engage with screw threads of the wheel bracket 419, the second wheel connection block 421 may be coupled and fixed to the wheel bracket 419. The guide wheel 411 may include any one of the first side guide wheel 131, the first front guide wheel 133, and the first rear guide wheel 135 of the first wheel assembly 123 described above, or any one of the second side guide wheel 141, the second front guide wheel 143, and the second rear guide wheel 145 of the second wheel assembly 125 described above.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A transfer apparatus comprising:

a first guide rail comprising a first side surface, a first front surface, and a first rear surface;

a second guide rail comprising a second side surface, a second front surface, and a second rear surface;

a driving module comprising a main rail and a moving block that moves along the main rail, wherein the main rail is provided between the first guide rail and the second guide rail in a first horizontal direction; and a carriage module coupled to the moving block and supporting an article, wherein the carriage module comprises:

a first side guide wheel configured to be in rolling contact with the first side surface of the first guide rail;

a first front guide wheel configured to be in rolling contact with the first front surface of the first guide rail;

a first rear guide wheel configured to be in rolling contact with the first rear surface of the first guide rail;

a second side guide wheel configured to be in rolling contact with the second side surface of the second guide rail;

a second front guide wheel configured to be in rolling contact with the second front surface of the second guide rail; and a second rear guide wheel configured to be in rolling contact with the second rear surface of the second guide rail, wherein the main rail has a groove extending in an extension direction of the main rail, and a portion of the moving block is accommodated in the groove, and wherein the driving module includes a core-type linear motor.

2. The transfer apparatus of claim 1, wherein each of the first side guide wheel and the second side guide wheel is configured to rotate about a second horizontal direction perpendicular to the first horizontal direction, and each of the first front guide wheel, the first rear guide wheel, the second front guide wheel, and the second rear guide wheel is configured to rotate about the first horizontal direction.

3. The transfer apparatus of claim 1, wherein the carriage module further comprises:

a carriage frame coupled to the moving block;

a first wheel bracket which is connected to a first side portion of the carriage frame and to which the first side guide wheel, the first front guide wheel, and the first rear guide wheel are mounted; and a second wheel bracket which is connected to a second side portion of the carriage frame and to which the second side guide wheel, the second front guide wheel, and the second rear guide wheel are mounted.

4. The transfer apparatus of claim 3, wherein the first side guide wheel is mounted to the first wheel bracket such that the first side guide wheel is allowed to move relative to the first wheel bracket in the first horizontal direction.

5. The transfer apparatus of claim 4, further comprising:

a first wheel connection block to which a rotation shaft of the first side guide wheel is coupled;

a first bolt which is inserted into a through-hole of the first wheel connection block and coupled to the first wheel bracket; and a spring which is provided inside the through-hole of the first wheel connection block to surround a side surface of the first bolt and is configured to elastically support the first wheel connection block in the first horizontal direction.

6. The transfer apparatus of claim 5, further comprising:

a bush provided on the side surface of the first bolt to support a first end of the spring; and a washer provided on the side surface of the first bolt to support a second end of the spring.

7. The transfer apparatus of claim 4, wherein the second side guide wheel is mounted to the second wheel bracket such that the second side guide wheel is not allowed to move relative to the second wheel bracket in the first horizontal direction.

8. The transfer apparatus of claim 7, further comprising:

a second wheel connection block to which a rotation shaft of the second side guide wheel is coupled; and a second bolt which is inserted into a through-hole of the second wheel connection block and couples the second wheel connection block to the second wheel bracket.

9. The transfer apparatus of claim 3, wherein at least one of the first front guide wheel and the first rear guide wheel is mounted to the first wheel bracket such that the at least one of the first front guide wheel and the first rear guide wheel is allowed to move relative to the first wheel bracket in a second horizontal direction perpendicular to the first horizontal direction, and at least one of the second front guide wheel and the second rear guide wheel is mounted to the second wheel bracket such that the at least one of the second front guide wheel and the second rear guide wheel is allowed to move relative to the second wheel bracket in the second horizontal direction.

10. The transfer apparatus of claim 1, wherein the main rail comprises a linear motor coil to which electric power is applied, and the moving block comprises a linear motor magnet.

11. A transfer apparatus comprising:

a first guide rail comprising a first side surface, a first front surface, and a first rear surface;

a second guide rail comprising a second side surface, a second front surface, and a second rear surface;

a driving module comprising a main rail and a moving block that moves along the main rail, wherein the main rail is provided between the first guide rail and the second guide rail in a first horizontal direction; and a carriage module coupled to the moving block and supporting an article, wherein the carriage module comprises:

a carriage frame coupled to the moving block;

a first wheel assembly comprising a first wheel bracket coupled to a first side of the carriage module and a first side guide wheel mounted to the first wheel bracket and configured to be in rolling contact with the first side surface of the first guide rail; and a second wheel assembly comprising a second wheel bracket coupled to a second side of the carriage module and a second side guide wheel mounted to the second wheel bracket and configured to be in rolling contact with the second side surface of the second guide rail, wherein the main rail has a groove extending in an extension direction of the main rail, and a portion of the moving block is accommodated in the groove, and wherein the driving module includes a core-type linear motor.

12. The transfer apparatus of claim 11, wherein the first side guide wheel is mounted to the first wheel bracket such that the first side guide wheel is allowed to move relative to the first wheel bracket in the first horizontal direction, and the second side guide wheel is mounted to the second wheel bracket such that the second side guide wheel is not allowed to move relative to the second wheel bracket in the first horizontal direction.

13. The transfer apparatus of claim 12, wherein the first side guide wheel is elastically supported by a spring and brought into close contact with the first side surface of the first guide rail.

14. The transfer apparatus of claim 11, wherein the first wheel assembly further comprises at least one first additional side guide wheel which is mounted to the first wheel bracket and configured to be in rolling contact with the first side surface of the first guide rail, and the second wheel assembly further comprises at least one second additional side guide wheel which is mounted to the second wheel bracket and configured to be in rolling contact with the second side surface of the second guide rail.

15. The transfer apparatus of claim 11, wherein the first wheel assembly further comprises:

a first front guide wheel which is mounted to the first wheel bracket and configured to be in rolling contact with the first front surface of the first guide rail; and a first rear guide wheel which is mounted to the first wheel bracket and configured to be in rolling contact with the first rear surface of the first guide rail, wherein the second wheel assembly further comprises:

a second front guide wheel which is mounted to the second wheel bracket and configured to be in rolling contact with the second front surface of the second guide rail; and a second rear guide wheel which is mounted to the second wheel bracket and configured to be in rolling contact with the second rear surface of the second guide rail.

16. The transfer apparatus of claim 15, wherein each of the first guide rail, the second guide rail, and the main rail extends in a vertical direction, each of the first front guide wheel, the first rear guide wheel, the second front guide wheel, and the second rear guide wheel is configured to rotate about the first horizontal direction, and each of the first side guide wheel and the second side guide wheel is configured to rotate about a second horizontal direction perpendicular to the first horizontal direction.

17. The transfer apparatus of claim 16, wherein at least one of the first front guide wheel and the first rear guide wheel is mounted to the first wheel bracket such that the at least one of the first front guide wheel and the first rear guide wheel is allowed to move relative to the first wheel bracket in the second horizontal direction, and at least one of the second front guide wheel and the second rear guide wheel is mounted to the second wheel bracket such that the at least one of the second front guide wheel and the second rear guide wheel is allowed to move relative to the second wheel bracket in the second horizontal direction.

18. A transfer apparatus comprising:

a first guide rail extending in a vertical direction and comprising a first side surface, a first front surface, and a first rear surface;

a second guide rail extending in the vertical direction and comprising a second side surface, a second front surface, and a second rear surface;

a driving module comprising a main rail that extends in the vertical direction and a moving block that moves along the main rail, wherein the main rail is provided between the first guide rail and the second guide rail in a first horizontal direction; and a carriage module coupled to the moving block and supporting an article, wherein the carriage module comprises:

a carriage frame coupled to the moving block;

a first wheel assembly coupled to the carriage frame, the first wheel assembly comprising a plurality of first side guide wheels configured to be in rolling contact with the first side surface of the first guide rail, a first front guide wheel configured to be in rolling contact with the first front surface of the first guide rail, a first rear guide wheel configured to be in rolling contact with the first rear surface of the first guide rail, and a first wheel bracket to which the plurality of first side guide wheels, the first front guide wheel, and the first rear guide wheel are mounted; and a second wheel assembly coupled to the carriage frame, the second wheel assembly comprising a plurality of second side guide wheels configured to be in rolling contact with the second side surface of the second guide rail, a second front guide wheel configured to be in rolling contact with the second front surface of the second guide rail, a second rear guide wheel configured to be in rolling contact with the second rear surface of the second guide rail, and a second wheel bracket to which the plurality of second side guide wheels, the second front guide wheel, and the second rear guide wheel are mounted, wherein the driving module comprises a linear motor configured to move the carriage module through an interaction between a linear motor coil provided in the main rail and a linear motor magnet provided in the moving block, each of the plurality of first side guide wheels is mounted to the first wheel bracket such that the each of the plurality of first side guide wheels is allowed to move relative to the first wheel bracket in the first horizontal direction, each of the plurality of second side guide wheels is mounted to the second wheel bracket such that the each of the plurality of second side guide wheels is not allowed to move relative to the second wheel bracket in the first horizontal direction, a number of the plurality of first side guide wheels is a same number as a number of the plurality of second side guide wheels, and wherein the main rail has a groove extending in an extension direction of the main rail, and a portion of the moving block is accommodated in the groove, and wherein the linear motor includes a core-type linear motor.

19. The transfer apparatus of claim 18, wherein each of the plurality of first side guide wheels is elastically supported by a spring and brought into close contact with the first side surface of the first guide rail.

20. The transfer apparatus of claim 18, wherein a first one of the first front guide wheel and the first rear guide wheel is mounted to the first wheel bracket such that the first one of the first front guide wheel and the first rear guide wheel is allowed to move relative to the first wheel bracket in a second horizontal direction perpendicular to the first horizontal direction, a second one of the first front guide wheel and the first rear guide wheel is mounted to the first wheel bracket such that the second one of the first front guide wheel and the first rear guide wheel is not allowed to move relative to the first wheel bracket in the second horizontal direction, a first one of the second front guide wheel and the second rear guide wheel is mounted to the second wheel bracket such that the first one of the second front guide wheel and the second rear guide wheel is allowed to move relative to the second wheel bracket in the second horizontal direction, and a second one of the second front guide wheel and the second rear guide wheel is mounted to the second wheel bracket such that the second one of the second front guide wheel and the second rear guide wheel is not allowed to move relative to the second wheel bracket in the second horizontal direction.

* * * * *